Oct. 13, 1931.　　　H. J. RUSSELL　　　1,826,826

READY MADE CUSP

Filed June 14, 1929

INVENTOR
Harry J. Russell,
BY
ATTORNEYS

Patented Oct. 13, 1931

1,826,826

UNITED STATES PATENT OFFICE

HARRY J. RUSSELL, OF TORONTO, ONTARIO, CANADA, ASSIGNOR TO BAKER & CO. INC., A CORPORATION OF NEW JERSEY

READY-MADE CUSP

Application filed June 14, 1929. Serial No. 370,843.

This invention relates in general to so-called ready-made gold cusps for crown and bridge work. These cusps usually comprise pieces of gold which have been shaped to conform to the occlusal surface of a natural tooth, and are combined with an artificial tooth facing and a backing of gold solder or the like.

In applying such cusps to artificial tooth facings, it is customary to place the cusp and the tooth facing in the desired relation to each other within a mold or cast composed of a special plastic material called "investment material", which when hardened serves to hold the cusp and the tooth facing in the proper relation while gold solder or the like is melted and flowed into the cusp and in back of the tooth facing. The gold solder serves to securely attach the facing to the cusp, and also as a backing or reinforcement for the cusp. During this operation it has been found that as the solder hardens and contracts, it pulls the cusps out of the mold or cast into an abnormal and improper relation to the tooth facing.

One object of my invention is to provide a ready-made cusp of the general character described having a projection or protuberance formed on the exterior thereof by stamping or pressing a portion of the metal outwardly from the inner side, whereby said protuberance can be embedded in the investment material to hold the cusp against displacement and reenforce the cusp against distortion, during the application of the solder.

Other objects are to provide such a cusp having a protuberance on the exterior surface of the lingual side thereof and inwardly of the edge; to provide a ready-made cusp of this character wherein the projection or protuberance can be easily removed and in no way impairs the finished artificial tooth; to provide a cusp of this character which can be easily and economically manufactured, and to obtain other advantages and results as will be more fully brought out by the following description.

Figure 1:
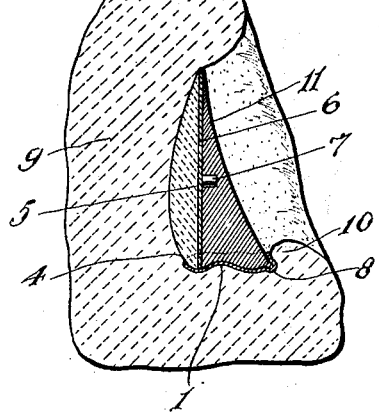
Figure 2:
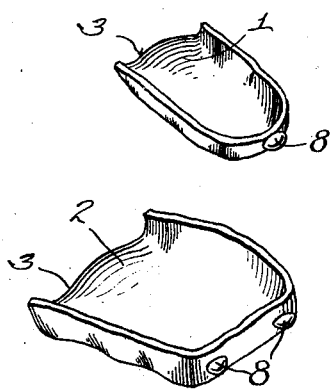

Referring to the accompanying drawings, in which corresponding and like parts are designated throughout the several views by the same reference characters, Figure 1 is a transverse vertical sectional view through an artificial tooth including a cusp embodying my invention, showing the tooth arranged in a block or mold of plaster or investment material, and Figure 2 is a composite perspective view of two cusps of different sizes embodying my invention.

Specifically describing the illustrated embodiment of the invention the reference characters 1 and 2 designate two ready-made cusps of different sizes, each of which comprises a sheet of gold or other suitable metal which is shaped to substantially conform to the occlusal surface of a natural tooth. The front or buccal or labial side 3 of each of the cusps is adapted to accurately contact with the occlusal edge 4 of an artificial tooth facing 5 of known construction which includes the usual metal backing plate 6 and facing pins 7 projecting from the rear of the facing. The opposite or rear or lingual side of the cusp is shown as provided with one or more integral projections or protuberances 8 which may be formed by stamping or pressing the metal of the cusp outwardly during the manufacture thereof, as shown in Figures 1 and 2. These protuberances are disposed inwardly of the edge of the cusp and are preferably round as shown.

In making an artificial tooth including a cusp embodying my invention, the facing 5 and cusp 1 or 2 are arranged in the proper relation within a mold or block of plaster or investment material 9 which is initially plastic and is capable of hardening. The investment material is caused to overlie the protuberances 8 as indicated at 10 so that said protuberances are in effect embedded in the material. Molten solder 11 is then flowed into the mold into contact with the backing plate 6 and the cusp 1 to firmly secure the cusp to the facing and to provide a reinforcement for the cusp. During this operation the protuberances 8 securely hold the cusp against movement in the investment or mold, and resist the tendency of the hardening and contracting solder to draw the cusp out of the investment into improper relation to the facing 5. Also the protuberances 8 reenforce the cusp against distortion during the soldering operation, and enable the formation of the cusp and protuberances with a minimum of metal. Furthermore, during the soldering operation, the solder enters the depressions formed on the inside of the cusps by the stamping of the protuberances outwardly, and therefore the cusp is securely interlocked with and bonded to the solder and effectually held against dislocation. After the tooth has been completed the mold is broken away from the tooth which is thereby removed from the mold; and thereafter the protuberances 8 may be burnished off so as to leave a smooth outer surface on the cusp.

It will be understood that while the embodiment of my invention above described is the now preferred one, the detailed construction of the cusps may be modified or changed by those skilled in the art without departing from the spirit or scope of my invention which is defined by the appended claims when construed in the light of the prior art.

Having thus described my invention, what I claim is:

1. As an article of manufacture, an artificial tooth cusp comprising a sheet of metal shaped to simulate the occlusal surface of a tooth and having an integral protuberance on the exterior and inwardly of the edge thereof formed of metal stamped or displaced outwardly from the inner side so as to form a corresponding depression on said inner side, said protuberance to be embedded in a plaster mold during the soldering operation in making an artificial tooth to hold said cusp against movement in the plaster and reenforce the cusp against distortion, and said depression to receive solder so as to bond the cusp to the solder.

2. As an article of manufacture, an artificial tooth cusp comprising a sheet of metal shaped to simulate the occlusal surface of a tooth and having a depression on the interior and inwardly of the edge of the lingual side thereof, said depression to receive solder during the soldering operation in making an artificial tooth so as to bond the cusp to the solder.

HARRY J. RUSSELL.